Jan. 30, 1945. J. P. FRAPS 2,368,461
CONTROL OF ELECTRIC SWITCHES
Filed June 23, 1943
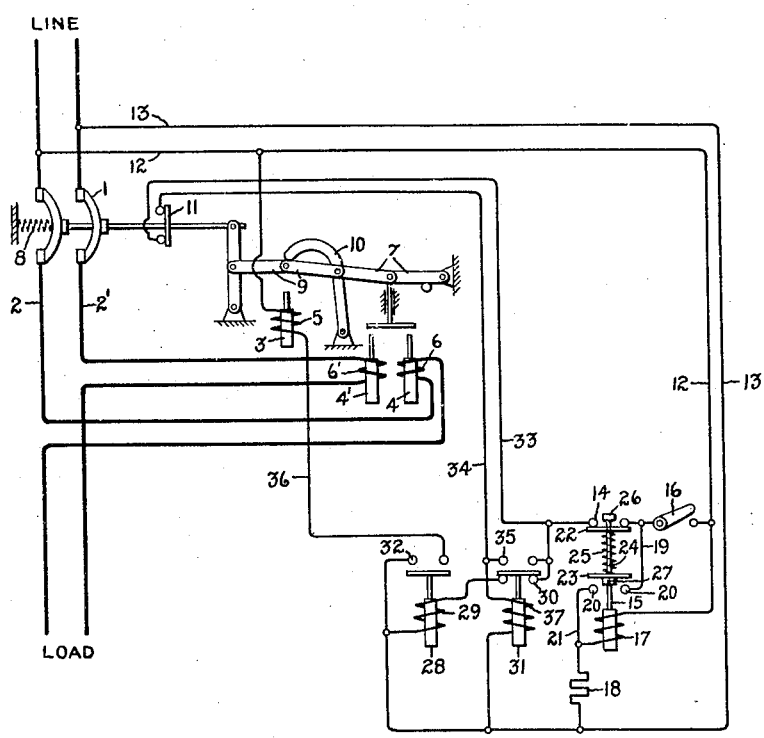
Inventor:
Junius P. Fraps,
by Harry E. Dunham
His Attorney.

Patented Jan. 30, 1945

2,368,461

UNITED STATES PATENT OFFICE 2,368,461

CONTROL OF ELECTRIC SWITCHES

Junius P. Fraps, Yeadon, Pa., assignor to General Electric Company, a corporation of New York Application June 23, 1943, Serial No. 491,927

10 Claims. (Cl. 175—294)

My invention relates to improvements in the control of electric switches and more particularly trip-free circuit breakers which are opened automatically on the occurrence of abnormal circuit conditions and which are arranged to have their closing operation controlled by the closing of a control switch and by associated apparatus energized from a source of electromotive force, such as the circuit controlled by the circuit breaker, subject to a material decrease in voltage.

Certain anti-pump control arrangements for automatic trip-free circuit breakers embody a plurality of devices which assume different relative positions during the closing and opening operations of the circuit breaker to prevent pumping thereof in the event the circuit breaker is closed on a faulty circuit and the control switch remains closed. The maintenance of these relative positions for the desired sequence of operations is predicated on a control source of electromotive force, such as a station battery, whose voltage is practically constant. Frequently it is necessary or desirable to obtain the control voltage from the circuit controlled by the circuit breaker on the line or source side of the circuit breaker.. But such voltage will vary considerably and may even practically disappear in case of a fault near the circuit breaker. In consequence of these decreases in or failure of voltage, the intended relative positions of the control devices throughout the desired sequence of operation are not maintained. Then, if the control switch is allowed to remain closed, either intentionally or otherwise, the circuit breaker is likely to continue to open and close rapidly while the abnormal condition lasts and the control switch remains closed. This so-called pumping action, if allowed to continue, is liable to result in serious damage to the circuit breaker and other connected apparatus.

An object of my invention is to provide for an automatic trip-free circuit breaker, an improved closing control arrangement which can be energized for operation from a source of electromotive force subject to material decrease in voltage without repeated opening and closing of the circuit breaker during abnormal conditions even though the control switch is left closed. Another object of my invention is to provide for an automatic trip-free circuit breaker an improved anti-pump control arrangement which positively prevents "pumping" even though energized directly from the circuit controlled by the circuit breaker. These and other objects of my invention will appear in more detail hereinafter.

In accordance with my invention, I provide for automatic trip-free circuit breakers an improved anti-pump control arrangement wherein a decrease in the voltage of the control source, sufficient to alter a predetermined sequence of operations of the control apparatus based on a fixed control voltage by virtue of a change in the relative positions of the apparatus, is ineffective to cause pumping. Also in accordance with my invention, I provide an improved control circuit which is so jointly controlled by a control switch and means responsive to the voltage of the control source as to prevent maintenance of the control circuit if the control voltage decreases materially or fails while the control switch remains closed during abnormal circuit conditions causing the opening of the circuit breaker. Further in accordance with my invention, I provide for automatic trip-free circuit breakers an improved anti-pump control arrangement wherein, although all of the electrically actuated apparatus may be arranged to be energized directly on the line side of the circuit controlled by the circuit breaker, pumping will not occur on the occurrence of abnormal circuit conditions causing material decreases or failure of the circuit voltage while the control switch is closed.

My invention will be better understood from the following description when considered in connection with the accompanying sheet of drawings, and its scope will be pointed out in the appended claims.

The single figure of the accompanying drawing diagrammatically illustrates an embodiment of my invention as applied to control the closing of a circuit breaker 1, which for simplicity is shown two-pole in a circuit comprising conductors 2 and 2'. It will, of course, be obvious that as far as my invention is concerned the number of poles in the circuit breaker is immaterial. As schematically shown, the circuit breaker is of the automatic trip-free type and is provided with electrically actuated closing means 3 and tripping means 4, 4' which are responsive to abnormal conditions on the circuit 2, 2' to effect the opening of the circuit breaker 1. Also, as schematically shown, the closing and tripping means are of the electromagnetic solenoid type comprising windings 5, and 6 and 6' respectively, although it will be apparent to those skilled in the art that my invention is not limited to this particular type. The tripping windings 6 and 6' are shown as overcurrent trip coils which are respectively responsive to the current flowing in the circuit conductors 2 and 2' to actuate the solenoid plungers 4 and 4' on the occurrence of excess current conditions whereby to collapse the over-center circuit breaker holding toggle 7. With the collapse of this toggle, the circuit breaker 1 is free to open under suitable bias such as furnished by a spring 8 since the over-center operating toggle 9 can collapse downwardly when the restraint of the abutment 10 is removed by the collapse of the holding toggle 7. The circuit breaker 1 is also provided with an "a" auxiliary switch 11 which closes during the closing operation of the circuit breaker and opens during the opening operation thereof.

In accordance with my invention, I provide for the closing means 3 a control arrangement which can be energized directly from the line or source side of the circuit breaker 1 or any other control source subject to material decrease in voltage without danger of pumping in consequence of such voltage variation. Thus in accordance with my invention, I provide a control circuit including conductors 12 and 13 respectively connected to the power circuit conductors 2 and 2' on the line side of the circuit breaker 1, contacts 14 in the control circuit, means 15 responsive to the voltage of the circuit 2, 2' on the line side of the circuit breaker for controlling the contacts 14, a control switch 16 arranged when closed to connect the control circuit to the source side of the circuit breaker and means jointly controlled by the voltage responsive means 15 and the control switch 16 for rendering the voltage responsive means inoperative to close the contacts 14 until after the control switch has been opened. As shown, the voltage responsive means 15 is an electromagnetic device such as a relay having an energizing winding 17 connected directly across the circuit 2, 2' on the line side of the circuit breaker through the conductors 12 and 13 and suitable current limiting means such as a resistance 18. Also, as shown, the means jointly controlled by the control switch 16 and the relay 15 is a bypass or lockout circuit for the winding 17. This circuit comprises the control switch 16, a conductor 19, contacts 20 of the relay 15 and conductor 21 all so arranged that when the relay 15 drops out because of decrease in voltage on the line side of the circuit breaker 1, the winding 17 is short circuited if the control switch 16 is closed. Consequently, with return of circuit voltage to normal value after clearance of a fault, even though the relay 15 is set to pick-up at such value, no response is possible until the control switch 16 is opened. In other words, whenever the voltage on the line side of the circuit breaker 1 decreases below a predetermined value such that the relay 15 drops out while the control switch 16 is closed, no pick-up of this relay can occur on return of voltage to the normal or pick-up value until after the control switch 16 is opened. With normal voltage on the line side of the circuit breaker 1, the voltage relay 15 is in the picked-up position with its contacts 20 open and its contacts 14 closed. If the voltage decreases suddenly to a low value, as in case of a short circuit close to the circuit breaker 1, then the relay 15 drops out to open its contacts 14 and to tend to close its contacts 20. During this tripping time or circuit breaker opening time, the voltage may return to normal before the contacts 20 are closed. If the voltage does so return while the control switch is closed, then the voltage relay 15 will pick up again without shorting its winding 17. In order to avoid this possibility, the circuit controlling members 22 and 23 on the voltage relay 15 are so arranged that each must make before the other breaks. This is shown schematically by having these members loosely mounted on the operating relay rod 24 and biased apart by a spring 25 against limiting collars or stops 26 and 27.

In order further to control the energization of the closing means 5, I connect in the control circuit a suitable electromagnetic switching means such as a closing relay 28 whose energizing winding 29 is in series with the control switch 16, the contacts 14 of the voltage relay 15, and the closed when deenergized contacts 30 of an electromagnetic control device such as a cut-off relay 31. The closing relay 28 is provided with circuit closing contacts 32, which in the picked-up position of this relay connect the closing coil 5 across the circuit 2, 2' on the line side of the circuit breaker 1. In order to effect deenergization of the closing coil 5 when the circuit breaker closing movement is sufficiently completed to insure latching under normal operating conditions, the cut-off relay 31 is arranged to be energized responsively to the closing operation of the circuit breaker so as to open its contacts 30 in the control circuit and thereby to effect deenergization of the closing relay 28. For this purpose, the control circuit includes a branch comprising conductors 33 and 34, and the circuit breaker auxiliary switch 11 when closed effects pick-up of the cut-off relay if the source voltage is normal, the contacts 14 are closed, and the control switch 16 is closed. In this pick-up action of the cut-off relay 31, its contacts 30 are opened to effect deenergization of the closing relay 28 and thereby to drop out this relay to open the circuit of the closing coil 5. Upon pick-up of the cut-off relay 31, this relay seals itself in through its circuit closing contacts 35 whereby to prevent reenergization of the closing relay 28 as long as the source voltage is sufficient to maintain the relay 31 in the picked-up position and the contacts 14 and the control switch 16 are closed.

Assuming the parts positioned as shown in the drawing, then as long as the voltage on the line side of the circuit breaker 1 is normal, the voltage relay 15 will be picked up as shown since its circuit is completed through the conductor 12, the resistance 18 and the conductor 13. Assuming now that a fault occurs on the load side of the circuit 2, 2' with sufficient current to effect the tripping of the circuit breaker by energization of one or both of the trip coils 6, 6', then the circuit breaker will be opened. Concurrently with the fault, the voltage on the line side of the circuit breaker is likely to fall sufficiently to drop out the voltage relay 15. Immediately upon the opening of the circuit breaker, however, voltage will return to normal on the line side of the circuit breaker, and the voltage relay 15 will again pick up unless the control switch 16 has been closed in the meantime. Assuming that it has not been closed and it is desired to close the circuit breaker, then, since the voltage relay 15 has closed its contacts 14 upon return of voltage, the closing of the switch 16 completes the control circuit as follows: the conductor 12, the control switch 16, the contacts 14 of the voltage relay 15, the contacts 30 of the cut-off relay 31, the winding 29 of the closing relay 28, and the conductor 13. This effects the energization of the closing relay which, if the voltage is normal, will pick up and close its contacts 32 and thereby complete the circuit of the closing coil 5 in the circuit comprising the conductor 13, the contacts 32, the conductor 36, the closing winding 5, and the conductor 12. Upon the closure of the circuit breaker auxiliary switch 11, the circuit of the winding 37 of the cut-off relay 31 is completed as follows: the conductor 12, the control switch 16, the contacts 14 of the voltage relay 15, the conductor 33, the auxiliary switch 11, the conductor 34, the winding 37 of the cut-off relay, and the conductor 13. If the voltage on the line side of the circuit breaker is normal, this cut-off relay 31 picks up to close its contacts 35 and thereby to maintain itself in the operated position as long as the control switch 16 is closed, the contacts 14 of the voltage relay 15 are closed, and the source voltage does not fall below a predetermined value. Upon pick-up of the cut-off relay 31, the circuit of the winding of the closing relay 28 is interrupted at the contacts 30 of the cut-off relay 31. This drops out the closing relay 28 to effect the de-energization of the closing coil 5.

If it be assumed that the cut-off relay 31 drops out at a value of voltage greater than the drop-out voltage of the relay 15 and that a fault causes the voltage to fall to a value between these two drop-out values, then the cut-off relay 31 would not maintain its operated position, but the relay 15 would remain in its picked-up position. If the circuit breaker 1 should trip open at this time, the control voltage would return to normal. Consequently, if the control switch 16 is closed, the circuit breaker would reclose because the relay 15 has not dropped out to short circuit its coil and open the control circuit. Obviously, if the relay 15 had dropped out during these conditions of voltage, the circuit breaker could not reclose. Consequently, it is essential that the relay 15 should drop out at the same or a slightly higher voltage than would allow the cut-off relay 31 to drop out.

As long as the control switch 16 remains closed and the voltage on the line side of the circuit breaker has not decreased sufficiently to drop out the relays 15 and 31, the closing relay 28 cannot be reenergized to effect another closing of the circuit breaker, except by opening the control switch 16. If the circuit breaker is closed on a fault, then the voltage on the line side of the circuit breaker may well fall to a value below the drop-out voltage of the relays 15 and 31. If this happens and the control switch 16 is still closed, then return of voltage to the normal value, following the opening of the circuit breaker 1, will not effect a reclosing of the circuit breaker even though the control switch 16 is closed since the drop-out of the relay 15 closed its contacts 20, which together with the control switch 16 in the closed position by-passed the relay winding 17 whereby to maintain it in the dropped-out position. In other words, regardless of whether the circuit breaker is closed and remains closed or opens when closed upon a fault, the circuit breaker cannot continue to pump even though the sequence of operations of the relays 28 and 31 is upset by the voltage change, since the relay 15 is automatically locked out as long as the control switch 16 remains in the closed position.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:

1. An arrangement for controlling the energization of a control circuit from a source of electromotive force comprising contacts in the control circuit, means adapted to operate in dependence on the voltage of the source for controlling said contacts, a control switch for connecting said circuit to the source, and means jointly controlled by said voltage dependent means and said control switch for rendering said voltage dependent means inoperative to close said contacts while said control switch is closed.

2. An arrangement for controlling the energization of a control circuit from a source of electromotive force comprising contacts in the control circuit, means adapted to operate in dependence on the voltage of the source for closing said contacts when the voltage is above a predetermined value, a control switch for connecting said circuit to the source, and means jointly controlled by said voltage dependent means and said control switch for rendering said voltage dependent means inoperative to reclose said contacts when they have been opened in consequence of the voltage of the source decreasing below said predetermined value.

3. In an anti-pump closing control arrangement for an automatic trip-free circuit breaker, a control circuit, means for controlling the energization of the control circuit from a source of electromotive force comprising a control switch in said control circuit, two electrically interlocked relays connected to be energized from said control circuit for operation in a predetermined sequence dependent on maintenance of the voltage of said source above a predetermined value, means for controlling said control circuit to prevent a pumping action of the circuit breaker in consequence of decrease of voltage below said value comprising a voltage dependent device for operation in accordance with the voltage of the source, and means controlled by said device, and dependent on the position of said control switch for preventing energization of said control circuit following a decrease in the voltage of the source below said predetermined value while the control switch is closed.

4. An arrangement for controlling the energization of a control circuit from a source of electromotive force comprising means adapted to operate in dependence on the voltage of the source having a first set of contacts in said control circuit, a control switch adapted to be operated to connect said circuit to the source, a lock-out circuit for preventing the effective reenergization of said voltage dependent means when the voltage of the source falls below a predetermined value while the control switch is closed, and means for jointly controlling said lock-out circuit including said control switch and a second set of contacts controlled by said voltage dependent means.

5. An arrangement for controlling the energization of a control circuit from a source of electromotive force comprising means adapted to operate in dependence on the voltage of the source having a first set of contacts in said control circuit, a control switch adapted to be operated to connect said circuit to the source, a lock-out circuit for preventing the effective reenergization of said voltage dependent means when the voltage of the source falls below a predetermined value while the control switch is closed, and means for jointly controlling said lock-out circuit including said control switch and a second set of contacts controlled by said voltage dependent means, said two sets of contacts controlled by said voltage dependent means being so arranged that each must make before the other breaks.

6. In an anti-pump control arrangement for an automatic trip-free circuit breaker provided with electrically actuated closing means and including an auxiliary switch closing in response to the closing of the circuit breaker, means for controlling the closing of said circuit breaker from a source of electromotive force comprising a closing relay operative in the picked-up position to connect said closing means to the source, a cut-off relay, a voltage relay connected to the source, a control switch effective in the closed position while the voltage relay is in the dropped-out position to prevent pick-up of the voltage relay, means for connecting the closing relay to the source upon closure of the control switch while the cut-off relay is in the dropped out position and the voltage relay is in the picked-up position, means for connecting the cut-off relay to the source upon closure of said auxiliary switch while said control switch is closed and said voltage relay is in the picked-up position, and means controlled by said cut-off relay upon pick-up thereof for disconnecting the closing relay from the source and for maintaining the cut-off relay in the picked-up position as long as the control switch remains closed and the voltage relay is in the picked-up position.

7. In an anti-pump control arrangement for an automatic trip-free circuit breaker provided with electrically actuated closing means and including an auxiliary switch closing in response to the closing of the circuit breaker, means for controlling the closing of the circuit breaker from a source of electromotive force comprising a closing relay operative in the picked-up position to connect said closing means across the source, a cut-off relay set to pick-up at substantially the normal voltage of the source, a voltage relay connected across said source and set to pick-up when the source voltage is substantially normal, a control switch effective in the closed position while the voltage relay is in the dropped-out position to prevent pick-up of the voltage relay, means for connecting the closing relay across the source upon closure of the control switch while the cut-off relay is in the dropped-out position and the voltage relay is in the picked-up position, means for connecting the cut-off relay across the source upon closure of said auxiliary switch while said control switch is closed and said voltage relay is in the picked-up position whereby to effect pick-up of the cut-off relay when the source voltage is substantially normal, and means controlled by said cut-off relay upon pick-up thereof for disconnecting the closing relay from the source and for maintaining the cut-off relay in the picked-up position as long as the control switch remains closed and the voltage relay is in the picked-up position.

8. In an anti-pump control arrangement for an automatic trip-free circuit breaker provided with electrically actuated closing means and including auxiliary switching means closing in response to the closing of the circuit breaker, means for controlling the closing of the circuit breaker from a source of electromotive force comprising electromagnetic switching means for effecting the energization of said closing means from the source, an electromagnetic cut-off device for controlling the energization of said switching means, an electromagnetic voltage device connected to be energized from the source and comprising a circuit controlling member movable to a first circuit controlling position when the source voltage is not less than a predetermined value and to a second circuit controlling position when the source voltage falls below said predetermined value by a given amount, a control switch effective in a given circuit controlling position while said member is in said second position to prevent movement thereof to said first position, means for effecting the energization of said electromagnetic switching means from the source upon actuation of the control switch to said given position while the electromagnetic cut-off device is deenergized and said member is in said first position, means for effecting the energization of said electromagnetic cut-off device from the source upon closure of said auxiliary switching means while the control switch is in said given position and said member is in said first position whereby to effect operation of the electromagnetic cut-off device when the source voltage is not less than said predetermined value, and means controlled by said electromagnetic cut-off device upon operation thereof to effect deenergization of said electromagnetic switching means and to maintain the electromagnetic cut-off device in its operated condition as long as the control switch is in said given position and said circuit-controlling member is in said first position.

9. In an anti-pump arrangement for controlling the closing of an automatic trip-free circuit breaker from the circuit controlled by the circuit breaker, the circuit breaker being provided with electrically actuated closing means and auxiliary switching means closing in response to the closing of the circuit breaker electromagnetic switching means for connecting said closing means across said circuit on the source side of the circuit breaker, an electromagnetic cut-off device for controlling the energization of said switching means, an electromagnetic voltage device connected across said circuit on the source side of the circuit breaker and comprising a circuit controlling member movable to a first circuit controlling position when the circuit voltage is substantially normal and to a second circuit controlling position when the circuit voltage falls below normal by a given amount, a control switch effective in a given circuit controlling position while said member is in said second position to prevent movement thereof to said first position, means for connecting said electromagnetic switching means across said circuit on the source side of the circuit breaker upon closure of the control switch while the electromagnetic cut-off device is deenergized and said member is in said first position, means for connecting said electromagnetic cut-off device across said circuit on the source side of the circuit breaker upon closure of said auxiliary switch while the control switch is in said given position and said member is in said first position whereby to effect operation of the electromagnetic cut-off device when the circuit voltage on the source side of the circuit breaker is substantially normal, and means controlled by said electromagnetic cut-off device upon operation thereof to effect deenergization of said electromagnetic switching means and to maintain the electromagnetic cut-off device in its operated condition as long as the control switch is in said given position and said circuit controlling member is in said one position.

10. In an anti-pump arrangement for controlling the closing of an automatic trip-free circuit breaker from the circuit controlled by the circuit breaker, the circuit breaker being provided with electrically actuated closing means and an auxiliary switch closing in response to the closing of the circuit breaker, a closing relay operative in the picked-up position to connect said closing means across said circuit on the source side of the circuit breaker, a cut-off relay, a voltage relay connected across said circuit on the source side of the circuit breaker and operative to the picked-up position when the circuit voltage is substantially normal, a control switch effective in the closed position while the voltage relay is in the dropped-out position to prevent pick-up of the voltage relay, means for connecting the closing relay across said circuit on the source side of the circuit breaker upon closure of the control switch while the cut-off relay is in the dropped-out position and the voltage relay is in the picked-up position, means for connecting the cut-off relay across said circuit on the source side of the circuit breaker upon closure of the auxiliary switch while the control switch is closed and the voltage relay is in the picked-up position whereby to effect pick-up of the cut-off relay when the circuit voltage is substantially normal, and means controlled by said cut-off relay upon pick-up thereof to effect deenergization of the closing relay and to maintain the cut-off relay in the picked-up position as long as the control switch remains closed and the voltage relay is in the picked-up position.

JUNIUS P. FRAPS.